United States Patent [19]

Simons

[11] Patent Number: 4,923,860

[45] Date of Patent: May 8, 1990

[54] METHOD OF MAKING A COLOR FILTER ARRAY USING LIGHT FLASH

[75] Inventor: Michael J. Simons, Ruislip, Great Britain

[73] Assignee: Eastman Kodak Company, Rochester, N.Y.

[21] Appl. No.: 408,581

[22] Filed: Sep. 18, 1989

[30] Foreign Application Priority Data

Oct. 18, 1988 [GB] United Kingdom ................ 8824366

[51] Int. Cl.⁵ ...................... B41M 5/035; B41M 5/26
[52] U.S. Cl. ........................................ 503/227; 8/471; 156/234; 156/235; 350/311; 427/261; 427/265; 430/7; 430/200; 430/201
[58] Field of Search .................... 8/471; 156/230, 234, 156/235, 239, 240; 350/311; 427/261, 265; 430/7, 200, 201; 503/227

[56] References Cited

U.S. PATENT DOCUMENTS 4,081,277 3/1978 Brault et al. .......................... 96/38.2
4,776,671 10/1988 Sumi et al. ........................... 350/311

Primary Examiner—Bruce H. Hess
Attorney, Agent, or Firm—Harold E. Cole

[57] ABSTRACT

A method of making an array of a repeating mosaic pattern of colorants carried on a support using (a) a plurality of donor materials each comprising a radiation-absorbing material and, respectively, a sublimable dye of a different color, and (b) a receiver element comprising a support having thereon a dye-receiving layer, wherein each donor material is in turn brought into face-to-face contact with the receiver and exposed patternwise to a high-intensity light source to transfer the desired pattern of dye to the receiver layer.

5 Claims, No Drawings

METHOD OF MAKING A COLOR FILTER ARRAY USING LIGHT FLASH

This invention relates to a method of making a color filter array element by thermal transfer.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Liquid crystal display devices are known for digital display in electronic calculators, clocks, household appliances, audio equipment, etc. There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the users needs.

One commercially-available type of color filter array element which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. This method contains many labor-intensive steps, requires careful alignment, is time-consuming and very costly. Further details of this process are disclosed in U.S. Pat. No. 4,081,277.

In addition, a color filter array element to be used in a liquid crystal display device may have to undergo rather severe heating and treatment steps during manufacture. For example, a transparent electrode layer, such as indium tin oxide, is usually vacuum sputtered onto the color filter array element. This may take place at temperatures elevated as high as 200° C. for times which may be one hour or more. This is followed by coating with a thin alignment layer for the liquid crystals, such as a polyimide. Regardless of the alignment layer used, the surface finish of this layer in contact with the liquid crystals is very important and may require rubbing or may require curing for several hours at an elevated temperature. These treatment steps can be very harmful to many color filter array elements, especially those with a gelatin matrix.

Another method of obtaining a color filter array element for a liquid crystal display device is described in EPA 246,334. This method employs a porous membrane to contain the dyes which are transferred by heat under reduced pressure using a metal mask. There is a problem in that technique in obtaining sufficient sharpness of the image since the dyes have to transfer from the donor layer to the receiver layer through the air gap formed by the thickness of the metal mask.

It would be desirable to provide a method of making a high quality color filter array element having good sharpness and which can be obtained easily and at a lower price than those of the prior art.

These and other objects are achieved in accordance with this invention which comprises a method of making an array of a repeating mosaic pattern of colorants carried on a support using (a) a plurality of donor materials each comprising a radiation-absorbing material and, respectively, a sublimable dye of a different color, and (b) a receiver element comprising a support having thereon a dye-receiving layer, wherein each donor material is in turn brought into face-to-face contact with the receiver and exposed patternwise to a high-intensity light source to transfer the desired pattern of dye to the receiver layer.

In a preferred embodiment of the invention, the mosaic pattern consists of a set of red, green and blue additive primaries.

In another preferred embodiment of the invention, each area of primary color and each set of primary colors are separated from each other by an opaque area, e.g. black grid lines. This has been found to give improved color reproduction and reduce flare in the displayed image.

The size of the mosaic set is not critical since it depends on the viewing distance. In general, the individual pixels (mosaic elements) of the set are from about 50 to about 600 μm. They do not have to be of the same size.

In a preferred embodiment of the invention, the repeating mosaic pattern of dye to form the color filter array element consists of uniform, square, linear repeating areas, with one color diagonal displacement as follows:

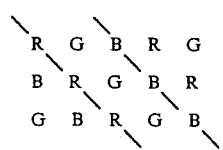

In another preferred embodiment, the above squares are approximately 100 μm.

As noted above, the color filter array elements of the invention are used in various display devices such as a liquid crystal display device. Such liquid crystal display devices are described, for example in UK Patents 2,154,355; 2,130,781; 2,162,674 and 2,161,971.

The donor material preferably comprises a support carrying a dye layer containing the radiation-absorbing material and optionally a binder.

The radiation-absorbing material of the donor sheet is preferably in the form of particles, e.g., light-absorbing particles and in particular particles of carbon black. When exposed to a high intensity light source through a patterned mask, the particles absorb the radiation and cause localised heating of the dye layer, thus causing patternwise heating of the sublimable dye.

The high intensity light source may be a electronic flash of sufficient power to effect transfer of the dyes of the donor sheets to the receiver.

Although any mask may be employed when exposing the donor sheets to the high intensity light source, in a particularly preferred embodiment a mirrored mask is employed. In this case, the side of the mask facing the high intensity light source is mirrored thus redirecting light not required for the transfer back to the light source. Further, if the light source has reflectors around it, then the "unused" light will be recycled. Another advantage is that light is reflected away from the non-image areas thus reducing the liklihood of unwanted heating thereof.

The mirrored mask may be made by coating a layer of photoresist directly on the silver mirror layer, exposing it patternwise and developing. The unwanted silver can then be removed in a ferric chloride etch solution. Any silver halide formed can be removed in a photographic fixer.

The receiver comprises a support and a receiver layer. Such a layer may comprise a porous silica-containing layer, but preferably comprises a polymeric binder.

The polymeric binder employed in the receiving layer may comprise, for example, a polycarbonate, a polyurethane, a polyester, a polyvinyl chloride, a polyamide, a polystyrene, a polyacrylonitrile, a poly(caprolactone) or mixtures or copolymers thereof. The polymeric binder may be present in any amount which is effective for the intended purpose. In general, good results have been obtained at a concentration of from about 0.25 to about 5 b/m².

In another preferred embodiment, the polymeric binder employed in the receiving layer is cross-linked after transfer of the filter array image. This enables the color filter display to be more resistant to the rather severe heating and etching treatment steps which are generally necessary in forming a liquid crystal display device. Examples of such cross-linkable polymeric binders include polymers which may be cross-linked by reaction with another substance present in or applied to the layer, such as epoxide resins (reacting with, for example, amines), unsaturated polyesters (using, for example, organic peroxides), phenolic resins (reacting with, for example, aldehydes), or polyurethanes (reacting with, for example, di-isocyanates); and polymer systems which may be cross-linked on exposure to light, in the presence of photoinitiators or photosensitizers. Further details of such cross-linkable polymeric binders are found in application Ser. No. of Simons, entitled "Thermally-Transferred Color Filter Array Element," filed of even date herewith.

The support for the color filter array may be any transparent material such as polycarbonate, polyethylene terephthalate, cellulose acetate, polystyrene, etc. In a preferred embodiment the support is glass.

A dye-donor element that is used in the process of the invention to form the color filter array element comprises a support having thereon a dye layer. Any dye or mixture of dyes can be used in such a layer provided they are transferable to the dye image-receiving layer of the color array element of the invention by the action of heat. Especially good results have been obtained with sublimable dyes. Examples of sublimable dyes include anthraquinone dyes, e.g., Sumikalon Violet RS ® (Sumitomo Chemical Co., Ltd.), Dianix Fast Violet 3R-FS ® (Mitsubishi Chemical Industries, Ltd.), and Kayalon Polyol Brilliant Blue N-BGM ® and KST Black 146 ® (Nippon Kayaku Co., Ltd.); azo dyes such as Kayalon Polyol Brilliant Blue BM ®, Kayalon Polyol Dark Blue 2BM ®, and KST Black KR ® (Nippon Kayaku Co., Ltd.), Sumickaron Diazo Black 5G ® (Sumitomo Chemical Co., Ltd.), and Miktazol Black 5GH ® (Mitsui Toatsu Chemicals, Inc.); direct dyes such as Direct Dark Green B ® (Mitsubishi Chemical Industries, Ltd.) and Direct Brown M ® and Direct Fast Black D ® (Nippon Kayaku Co. Ltd.); acid dyes such as Kayanol Milling Cyanine 5R ® (Nippon Kayaku Co. Ltd.); basic dyes such as Sumicacryl Blue 6G ® (Sumitomo Chemical Co., Ltd.), and Aizen Malachite Green ® (Hodogaya Chemical Co., Ltd.);

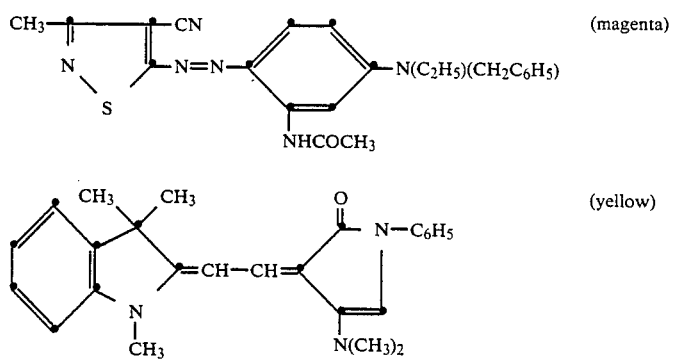

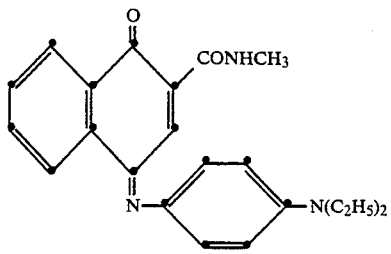

or any of the dyes disclosed in U.S. Pat. No. 4,541,830, the disclosure of which is hereby incorporated by reference. The above subtractive dyes may be employed in various combinations to obtain the desired red, blue and green additive primary colors. The dyes may be mixed within the dye layer or transferred sequentially if coated in separate dye layers. The dyes may be used at a coverage of from about 0.05 to about 1 g/m².

The dye and radiation-absorbing material in the dye-donor element are preferably dispersed in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 g/m².

The dye layer of the dye-donor element may be coated on the support or printed thereon by a printing technique such as a gravure process.

Any material can be used as the support for the dye-donor element provided it is dimensionally stable and can withstand the heat of the thermal printing process. Such materials include polyesters such as poly(ethylene terephthalate); polyamides; polycarbonates; glassine paper; condenser paper; cellulose esters; fluorine polymers; polyethers; polyacetals; polyolefins; and polyimides. The support generally has a thickness of from about 2 to about 30 μm. It may also be coated with a subbing layer, if desired.

The dye-donor element employed in the invention may be used in sheet form or in a continuous roll or ribbon.

After the dyes are transferred to the receiver, the image may be treated to further diffuse the dye into the dye-receiving layer in order stabilize the image. This may be done by radiant heating, solvent vapor, or by contact with heated rollers. The fusing step aids in preventing fading and surface abrasion of the image upon exposure to light and also tends to prevent crystallization of the dyes. Solvent vapor fusing may also be used instead of thermal fusing.

The following examples are provided to illustrate the invention.

EXAMPLE 1

In this example, a patterned mirror was prepared in order to provide a means to transfer dye from a dye-donor in a repeating mosaic pattern to a receiver.

A patterned glass mirror was made by removing the lacquer from the back of a commercially-available glass silvered mirror by treating it with a mixture of dimethyl formamide and cyclohexanone (3:1) at 95° C. for 15 minutes. The revealed metal surface was then coated with a quantity of Kodak Micro Resist 747 ® photoresist and the excess poured off so as to leave a thin film. It was then dried, exposed through a mask of the desired pattern, developed for about two minutes in Kodak Micro Resist ® developer, rinsed for 15 seconds in Kodak Micro Resist ® rinse, and then etched in a solution of 400 g/l of FeCl₃.6H₂O to remove areas of the mirrored surface to give an array of clear squares of 300 μm edge length. Each square touched the corner of the next square along one diagonal of the array, and was laterally separated from the adjacent clear squares along the orthogonal axes of the array by 600 μm.

Dye donor sheets were prepared as follows:

Carbon Dispersion

The following composition was ball-milled for two days:
Carbon Black (Regal 300 ®—Cabot Corp.) 2.4 g
Ethyl cellulose 0.9 g
Butanone 60 ml

Red Donor Sheet

A solution was prepared as follows:
Yellow Dye-2 illustrated below 0.025 g
Magenta dye illustrated above 0.020 g
Ethyl cellulose 0.040 g
Butanone 8 ml
Carbon Dispersion 2 ml
Two drops of a 2% solution of polydimethylsiloxane in toluene were added and the composition was coated on a 16 μm poly(ethylene terephthalate) support using a coating blade set 75 μm above the film.

Green Donor Sheet

A solution was prepared as follows:
Yellow Dye-2 illustrated below 0.025 g
Cyan dye illustrated above 0.035 g
Ethyl cellulose 0.060 g
Butanone 8 ml
Carbon Dispersion 3 ml
This composition was coated as described above for the Red Donor Sheet.

Blue Donor Sheet

A solution was prepared as follows:
Magenta dye illustrated above 0.020 g
Cyan dye illustrated above 0.035 g
Ethyl cellulose 0.060 g
Butanone 7 ml
Carbon Dispersion 3 ml
This composition was coated as described above for the Red Donor Sheet.

A dye-receiver was prepared by coating a glass plate with a thin layer of Geon 427 ® (B. F. Goodrich Company) vinyl chloride:vinyl acetate copolymer (86:14). The solution was poured onto the glass plate, spread evenly, and then the surplus poured of. The resulting thin layer was allowed to dry, giving a clear, dry film of about 3 μm thick.

The red donor sheet was placed on the receiver with the coated side facing the vinyl chloride-vinyl acetate copolymer. The patterned glass mirror was placed on the poly(ethylene terephthalate) support of the donor element, the patterned surface of the mirror being in contact with the support. This assembly was placed in a vacuum frame with the vacuum frame cover sheet overlying the assembly. A vacuum was then applied to hold the assembly in close contact. The assembly was then exposed to a flash as described below. In the clear window areas of the mirror, the high-intensity light passed through to the dye-donor. The carbon in the dye-donor then converted the high-intensity light energy to thermal energy to selectively transfer the dye.

The 7.5×4.5 cm window of a Mecablitz ® Model 45 (Metz AG Company) was fitted with a mirror box 6 cm long to reduce the exit aperture to 4.5 cm×4.5 cm. The flash unit was placed with the window of the mirror box against the patterned glass mirror and the flash fired at full intensity. Upon separating the assembly, dyes forming a red color were seen to have transferred to the coated surface of the glass plate in a square array pattern corresponding to the clear areas of the mirror.

This process was repeated with the green and blue dye donor sheets successively with the patterned glass mirror laterally shifted 300 μm each time. The end result was a color filter array comprising red, green and blue square patches of edge length approximately 300 μm.

Yellow Dye-2

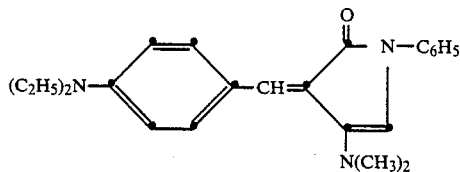

EXAMPLE 2

Cyan, magenta and yellow donor sheets were prepared by coating on a 6 μm poly(ethylene terephthalate) support the following compositions made up with butanone solvent to give the stated coated laydowns. The carbon was ball-milled to give a dispersion as in Example 1.

Yellow Composition

Yellow dye illustrated above 0.25 g/m²
Carbon Black Dispersion 0.76 g/m²
Cellulose acetate propionate 0.38 g/m²

Magenta Composition

Magenta dye illustrated above 0.20 g/m²
Carbon Black Dispersion 0.58 g/m²
Cellulose acetate propionate 0.30 g/m²

Cyan Composition

Cyan dye illustrated above 0.39 g/m²
Carbon Black Dispersion 1.17 g/m²
Cellulose acetate propionate 0.58 g/m²

The yellow donor was placed on a receiver with the coated side facing the receiving layer as in Example 1. The patterned mirror described in Example 1 was then placed on top of the donor sheet as described in Example 1 and the donor sheet exposed to a flash from the flashgun as described in Example 1.

This process was repeated with the magenta and cyan dye-donors with the patterned glass mirror laterally shifted 300 μm each time. The dyes were then driven deeper into the receiving layer by an overall heating step using a hot metal plate maintained at 150° C. Microscopic examination showed the plate to bear an array of yellow, magenta and cyan square patches of approximately 300 μm edge length.

The process was repeated with the patterned mirror shifted to give superposition of two transferred dyes to produce each additive color of the mosaic pattern. Thus, green filter patches were observed where yellow and cyan squares had been superposed, blue where magenta and cyan squares had been superposed, and red where magenta and yellow squares had been superposed.

EXAMPLE 3

Color filter arrays of yellow, magenta and cyan dye patches were prepared and processed as in Example 2, except that the receiving glass plate was coated with a polymer which was capable of being cross-linked. Two examples were prepared, one without a cross-linking agent and one with a chromium carbonyl agent which would cause cross-linking on irradiation with light.

Unhardened receiver

This was prepared by applying to the plate a 3% solution of methyl methacrylate/methacrylic acid copolymer (weight ratio 88:12) in 9:1 acetone:methanol. The excess was then poured off and allowed to dry, giving a dry film of about 3 μm thick.

Hardened receiver

This was prepared as above, but 0.1% of benzene chromium tricarbonyl was added to the polymer solution which would cause cross-linking on irradation with light.

After processing, the dyes were then driven deeper into the receiving layer by an overall heating step using a hot metal plate maintained at 150° C.

After transfer of the dyes to the receiving glass plates, they were then heated at 170° C. for 30 minutes, and the filter patterns were examined microscopically.

The transferred dye filter pattern in the unhardened receiver was seen to have softened edges to the filter squares after the heating step, due to dye diffusion.

After dye transfer to the hardened receiver, the layer was photolytically cross-linked or hardened by exposing it to daylight, augmented by a 15 minute exposure to an 8-watt fluorescent ultraviolet lamp, held 10 cm distant. After the 170° C. heat treatment described above, the edges of the filter squares of the hardened receiver were seen to be significantly sharper than in the comparative unhardened example.

The hardening of the layer was confirmed by wiping the layer with a tissue soaked in methanol; the hardened layer was not removed by this process, whereas the unhardened layer was wiped off.

The invention has been described in detail with particular reference to preferred embodiments thereof, but it will be understood that variations and modifications can be effected within the spirit and scope of the invention.

What is claimed is:

1. A method of making an array of a repeating mosaic pattern of colorants carried on a support using (a) a plurality of donor materials each comprising a radiation-absorbing material and, respectively, a sublimable dye of a different color, and (b) a receiver element comprising a support having thereon a dye-receiving layer, wherein each donor material is in turn brought into face-to-face contact with the receiver and exposed patternwise to a high-intensity light source to transfer the desired pattern of dye to the receiver layer.

2. The method of claim 1 in which the receiver layer comprises silica or a polymeric layer.

3. The method of claim 1 in which there are three donor materials which provide the mosaic pattern in the additive primary colors red, green and blue.

4. The method of claim 1 in which the high-intensity light source is an electronic flash.

5. The method of claim 4 in which the exposure is carried out using a patterned mask comprising non-image areas having a mirrored surface facing the high-intensity light source.

* * * * *